United States Patent
Tomczak et al.

(10) Patent No.: US 8,985,711 B2
(45) Date of Patent: Mar. 24, 2015

(54) METHOD FOR OPERATING A MECHANICAL PARKING BRAKE

(71) Applicant: Ford Global Technologies, LLC, Dearborn, MI (US)

(72) Inventors: Peter Tomczak, Boppard (DE); Reiner Schmid, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 13/737,865

(22) Filed: Jan. 9, 2013

(65) Prior Publication Data

US 2013/0175124 A1 Jul. 11, 2013

(30) Foreign Application Priority Data

Jan. 9, 2012 (DE) .......................... 10 2012 200 178

(51) Int. Cl.
*B60T 8/32* (2006.01)
*F16D 63/00* (2006.01)
*B60T 13/58* (2006.01)
*B60T 13/66* (2006.01)

(52) U.S. Cl.
CPC ............... *F16D 63/00* (2013.01); *B60T 13/588* (2013.01); *B60T 13/662* (2013.01)
USPC ........... 303/89; 303/191; 188/106 P; 188/265

(58) Field of Classification Search
USPC ........ 188/72.7–72.9, 106 F, 265; 303/89, 191
See application file for complete search history.

(56) References Cited

U.S. PATENT DOCUMENTS

| 3,185,264 | A | 5/1965 | Nordström et al. |
| 6,971,485 | B1 * | 12/2005 | Sherman II .................. 188/72.7 |
| 7,025,181 | B2 * | 4/2006 | Affeldt et al. .................. 188/170 |
| 2002/0033642 | A1 * | 3/2002 | Holl .............................. 303/191 |
| 2006/0225971 | A1 * | 10/2006 | Jaeger ........................ 188/106 P |
| 2009/0159381 | A1 * | 6/2009 | Mohr et al. .................... 188/265 |

FOREIGN PATENT DOCUMENTS

| DE | 4004149 A1 | 8/1991 |
| DE | 4027810 A1 | 3/1992 |
| DE | 10345485 A1 | 4/2005 |
| GB | 1428230 | 3/1976 |

* cited by examiner

*Primary Examiner* — Christopher Schwartz
(74) *Attorney, Agent, or Firm* — Raymond Coppiellie; Alleman Hall McCoy Russell & Tuttle LLP

(57) ABSTRACT

The invention relates to a method for operating a brake device, in particular of a motor vehicle, wherein the brake device comprises a service brake and a mechanical parking brake, wherein the parking brake can be actuated by means of a mechanical actuating element, comprising at least the steps of establishing that the actuating element has been moved from an idle position into a position of use, simultaneously controlling a pressure-increasing element, so that a hydraulic pressure is generated, which hydraulic pressure acts on a brake element that is common with the holding element, blocking the common brake element of the service brake and the parking brake with a mechanical block of the mechanical parking brake.

16 Claims, 2 Drawing Sheets

METHOD FOR OPERATING A MECHANICAL PARKING BRAKE

CROSS REFERENCE TO RELATED APPLICATIONS

This application claims priority to German application number 102012200178.6 filed on Jan. 9, 2012, the entire contents of which are hereby incorporated herein by reference for all purposes.

BACKGROUND AND SUMMARY

The present invention relates to a method for operating a brake device, in particular of a motor vehicle, wherein the brake device comprises a service brake and a mechanical parking brake, wherein the parking brake can be actuated by means of a mechanical actuating element.

It is known to provide on motor vehicles dedicated actuating elements for the parking brake such as a hand brake lever or foot lever. The parking brakes concerned are mechanical parking brakes that are connected, for example, by way of a cable pull to the actuating element in the vehicle internal space. The driver actuates the actuating element, i.e. pulls the hand brake lever upwards or depresses the foot lever, as a consequence of which, for example, a moment of force is generated, which is converted by way of the cable pull into a tensile force, whereby the clamping force of the parking brake is generated.

In the case of other parking brakes, this force generated by means of the driver is replaced by an electromechanical force, which means that the parking brake is actuated and released by means of a switching arrangement. DE 103 45 485 A1 discloses, for example, a brake device having a service brake and a parking brake, in which the parking brake is actuated by means of a switching arrangement of this type, wherein a hydraulic pressure-generating device is provided for hydraulically actuating the braking device. A self-locking, electric force-generating device produces an additional actuation of the parking brake. Both the hydraulic pressure-generating device and the electrical force generating device engage an actuating element. In the event of the parking brake function being actuated, the additional actuation becomes effective once the hydraulic actuation is initiated, wherein the level of the actuating force of the additional actuation is greater than the level of the actuating force of the hydraulic actuation.

In the case of parking brakes of this type that can be actuated by means of a switching arrangement, the actuation of the switch generally produces the maximum holding force of the parking brake. Initially, this appears to be advantageous but it is also disadvantageous. For instance, the driver does not in fact receive direct feedback with respect to the holding force applied by way of the original actuating element, since a switch is simply pushed, pulled or actuated in another manner and the maximum holding force is always applied, in that corresponding actuators are actuated by an electrical signal. For instance, the parking brake is actuated to a maximum or held in the release position in a similar manner to that in the digital 0 or 1 system. Some drivers would, on the other hand, prefer a smooth adjustment of the holding force between the release position and the position in which maximum force is exerted and also receive corresponding feedback regarding the actual holding force. For instance, it is not always necessary to generate the maximum holding force, wherein, for example, in the case of a slight incline of the parking area, a comparatively small holding force is required but then also a comparatively small releasing force. Some drivers use the parking brake also as a steering aid or also as an emergency brake in order to guide a vehicle from a critical situation into a non-critical situation. It is particularly in driving manoeuvers of this type that it is not desirable to generate a holding force as noted above.

However, it can also be the case with mechanical parking brakes that an extremely high level of holding force up to the maximum holding force is to be applied by way of the actuating element. Under particular environmental conditions, such as a great incline of the parking area (e.g. 20-30%), it can be necessary in the case of mechanical parking brakes to provide high clamping and/or holding forces in order to secure the vehicle by means of the parking brake against rolling away. In order to be able to apply these forces easily, it would be advantageous, for example, to increase the size of the grip length of the hand lever. However, this is not advantageous with regard to the seat position and consequently also with regard to the gripping distance and the pulling geometry of the driver. In addition, it is problematic in so doing that a longer hand brake lever has an adverse effect on the design and ergonomics of the internal compartment, i.e. not only owing to possible problems relating to space.

The object of the invention is therefore to provide an improved method for operating a brake device having a mechanical parking brake.

The object is achieved by means of a method having the features of claim 1. The subordinate claims disclose additional, particularly advantageous embodiments of the invention.

It is to be noted that the features explained individually in the description hereinunder can be mutually combined in any technically expedient manner and disclose additional embodiments of the invention. In addition, the description characterizes and specifies the invention.

A mechanical actuating element in terms of the invention is a foot lever or preferably a hand lever that is also known as a hand brake lever, wherein the actuation of the actuating element, for example, initiates both the actuation and also the release of the holding elements by way of a cable pull. The parking brake can also be described as a hand brake or also as an immobilization brake. A service brake in terms of the invention is an electronic brake system that comprises, for example, an ESP-unit, wherein braking forces can be applied by means of a hydraulic system. These electronic brake systems are known and for this reason are not described in detail.

With the object of the invention in mind, it is provided that initially it is established that the actuating element is moved from an idle position into a position of use, which can be established, for example, using corresponding sensors. The sensors generate a control signal at the same time as it is established that the actuating element has been actuated and transmit said control signal to the service brake and/or preferably to its pressure-generating element, which can be, for example, a hydraulic pump of the ESP-unit. Naturally, it is also possible to interposition a central control unit (CPU). In so doing, the term 'at the same time as' in the terms of the invention is intended to describe only that the control signal is generated simultaneously with the establishment of the actuation of the actuating element, i.e. the simultaneous electrical control process, in other words, the transmission of the electric signal. Naturally, a predetermined delay of the mechanical components is provided, until the hydraulic pump of the ESP-unit reacts to the control signal.

If the control signal is directed to the exemplary hydraulic pump of the service brake and/or of an ESP-unit, hydraulic pressure in the service brake and/or the hydraulic pump of the ESP-unit is built up and/or increased, in that the hydraulic pump is brought into operation and/or operated according to the control signal (time-delayed). The generated hydraulic pressure affects the parking brake and/or the brake elements in a manner that increases the holding force. It is feasible that the driver is required to apply less force in order to move the actuating element into the position of maximum use, regardless of whether feedback is received or not regarding the actual holding force applied. Any hydraulic assistance provided means that the force to be applied by the driver is reduced. Consequently, in response to the pressure applied, the feedback to the driver in the case of an identical clamping force is reduced. However, it is advantageous that the parking brake is supported by means of an ESP-unit and/or by means of its hydraulic pump.

Hitherto known mechanical parking brakes did have an actuating element that generated the maximum holding force according to the force-lever principle, which means, that, for example, a hand brake lever had to be extended in length in order to be able to generate a high level of holding force in the case of a comparatively small application force. A particular advantage of the invention is to be seen in the fact that, for example, it is not necessary to extend the length of the hand brake lever in order to apply a correspondingly high holding force. The reason being that the necessary holding force of the parking brake is generated during the interaction of the mechanical parking brake with the service brake respectively with the ESP-unit and/or with its hydraulic pump. For instance, a relatively short hand brake lever can be used, by means of which owing to the force transmission ratio the maximum holding force could not in actual fact be applied, but this is possible with the invention since even in the case of a short hand brake lever the maximum holding force can be applied. In other words, the hydraulic pressure supports the application of the holding force. However, this does not mean in terms of the invention that the service brake likewise functions and/or is increased in its braking effect while the parking brake is applied. On the contrary, only the parking brake is active. The increase in hydraulic pressure serves only to provide support while the actuating element is actuated. For instance, it is also ensured that it is not necessary to continuously maintain the hydraulic pressure in order to maintain the holding force when the vehicle is parked up. Both the service brake and also the parking brake act on the common brake elements. The hydraulic pressure of the hydraulic pump, for example of the ESP-unit, act on the brake elements, so that these are actuated. However, the mechanical lock of the mechanical parking brake is simultaneously active, so that the brake elements are locked and remain actuated if the actuating element is no longer actuated and/or pulled on further (hand brake lever) or depressed (foot lever). The hydraulic pump of the ESP-unit is therefore only active while the actuating element is actuated. In order to release the holding force, the lock is released in a known manner. The actual actuation of the brake elements has, however, a direct effect on the actuating resistance of the actuating element. As the actuating force increases, the actuating resistance becomes greater.

It is also advantageous that the actuating element can be moved smoothly out of the idle position into one of its positions of use. This means, that it is fundamentally not necessary to move the actuating element into the position of maximum use in order to generate the maximum holding force. On the contrary, an intermediate position of use can be selected, if, for example, the incline of the parking area on which the vehicle is standing is slight. The lock of the parking brake as previously described is active in all the intermediate positions of use. The driver can also apply in a controlled manner the holding force that is to be applied. It is also possible, only to render possible the interaction of the service brake and/or the hydraulic pump of the ESP-unit and the parking brake if the velocity of the vehicle is approaching zero or if the vehicle is actually stationary. A routine can also be stored in the control device, which routine adjusts actual drive dynamic values according to stored limit values in order thus to maintain the important function of the exemplary ESP, wherein the method is not performed if it is necessary for the ESP to engage in a stabilizing manner in its drive states provided for this purpose. Similarly, it would still be possible to use only the mechanical force of the parking brake also as an emergency brake when driving the vehicle.

Naturally, a hydraulic support of the holding force can be achieved even if the ignition is switched off. For this purpose, it is only necessary for the ESP-unit to be controlled accordingly.

In addition, it is advantageous in terms of the invention if the hydraulic support of the parking brake is controlled depending upon a static or dynamic state of the vehicle. The static or dynamic state can be established, for example, by means of wheel rotation rate signals, i.e. for example, by means of corresponding wheel sensors that indicate the rotational speed of the wheels.

If it is established that the vehicle is in the static state, i.e. is stationary and/or almost stationary, and if it is established that the actuating element is actuated, then the ESP-unit and/or its hydraulic pump influence the wheel cylinder of the wheel brakes, in particular of the rear wheel brakes, with a constant hydraulic pressure that supports a maximum holding moment. If the actuating element is now latched in the selected position, the hydraulic pre-stressing of the wheel brake and/or of the rear wheel brake is secured. In so doing, the object is achieved if the parking brake is set, i.e. latched in, during the hydraulic pressure phase, and the holding moment is statically secured.

This can occur in the simplest embodiment such that following a comparatively long presence of the parking brake signal (i.e. for example equal to or more than 10 seconds) it can be assumed that the parking brake has been set and/or has been actuated, wherein the ESP-unit then sets the hydraulic pressure for the rear wheel brakes back to zero.

It is feasible to provide an additional monitoring element, for example, in the embodiment as a switch and/or sensor, which activates, i.e. generates a corresponding control signal if the actuating element (hand brake lever or foot lever) latches at least in the first tooth. This is accordingly detected by the control unit of the ESP-unit and/or by the central control unit, wherein upon actuating the actuating element in the static mode, the (rear) brake calipers are influenced by the hydraulic pressure, wherein the hydraulic pressure is maintained depending upon changing events.

In other words, the hydraulic pressure is maintained until the established actuating signal the signal is generated that the brake element is latched in, i.e. the parking brake is applied, or until the established actuating signal is cancelled, and in addition the signal is generated that the brake element passively remains at rest, i.e. the parking brake is not applied.

In one embodiment of the invention, it is possible by actuating the actuating element and consequently by generating additional hydraulic pressure always to generate the maximum possible holding moment by means of the ESP-unit and/or by means of its hydraulic pump. The holding moment generated in this manner is greater in comparison to the holding moment (electric park brake) generated by an electric switch alone or in comparison to the holding force applied only mechanically, since the resulting holding moment is greater by the amount of actuating force of the actuating element, i.e. by this proportion of mechanical force.

In a further possible embodiment, the force could be increased in proportion to the travel of the lever, which increase in force could be implemented by means of a corresponding angle sensor that is arranged in an expedient embodiment on the actuating element. The signal of the angle sensor can be converted in the ESP-unit and/or in its or the central control unit, so that the hydraulic pump is activated accordingly.

If the park brake is in the dynamic mode (the wheels rotate at a predetermined rotational speed), and if the actuating element is actuated, the ESP-unit is controlled in such a manner that the wheel brakes, i.e. preferably the rear wheel brakes, are influenced by a hydraulic pressure, which corresponds to a deceleration of, for example, 1.5 m/s$^2$ at the maximum loaded state of the vehicle, so that a defined response of the dynamic parking brake is comparable to a "jump in" function. In other words, the initial deceleration is a step function with moderated amplitude and ensures a defined delayed start. The deceleration can now still also be proportionally increased by way of the actuating force on the actuating element.

It is within the terms of the invention if the actuating element is embodied according to valid standards, for example, legal requirements, wherein the dynamic deceleration is also fulfilled without any hydraulic support. The deceleration threshold is at least 1.5 m/s$^2$.

DETAILED DESCRIPTION

Figure 1:
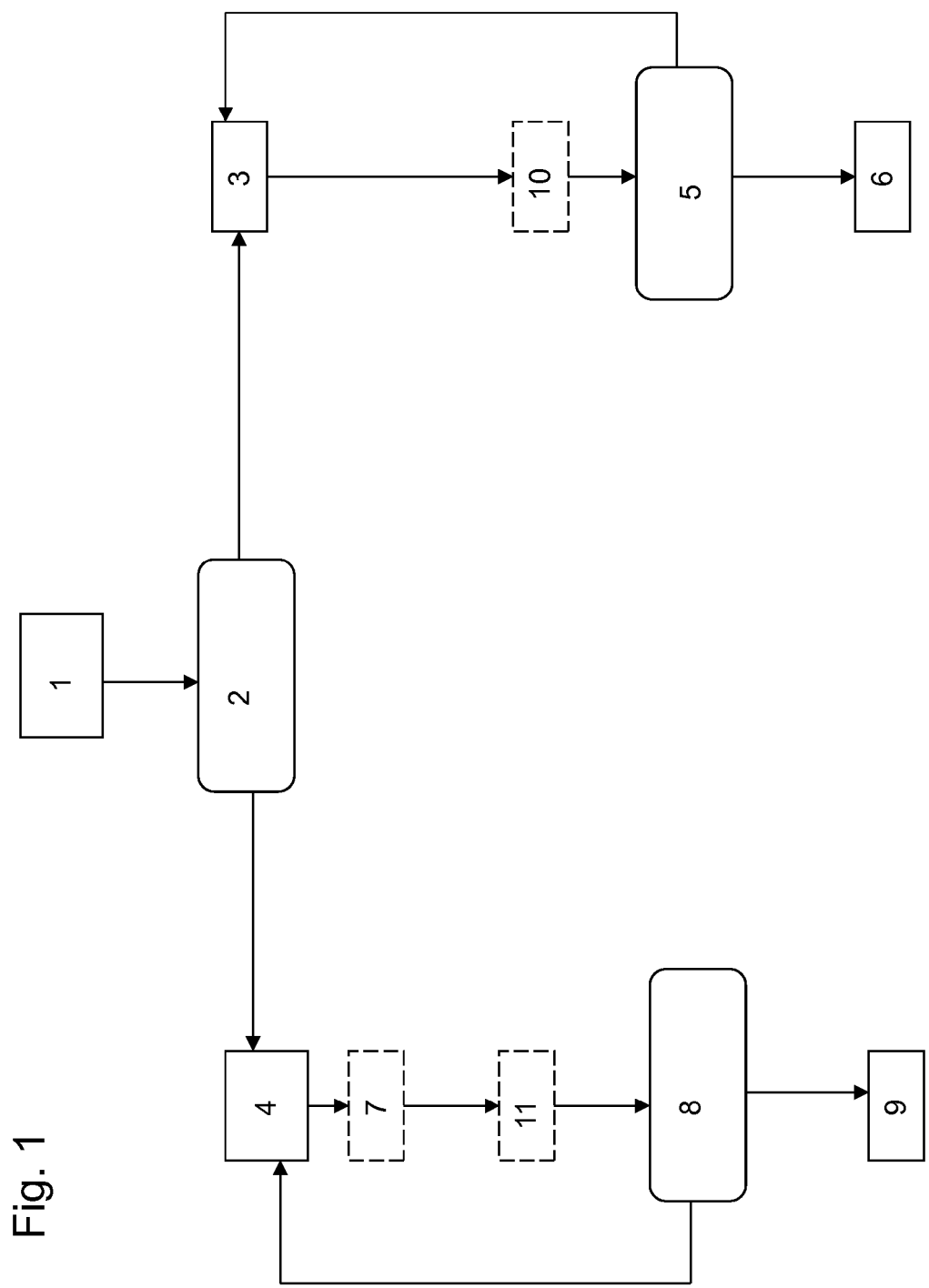
FIG. 1 illustrates a flow chart of the method in accordance with the invention.
Figure 2:
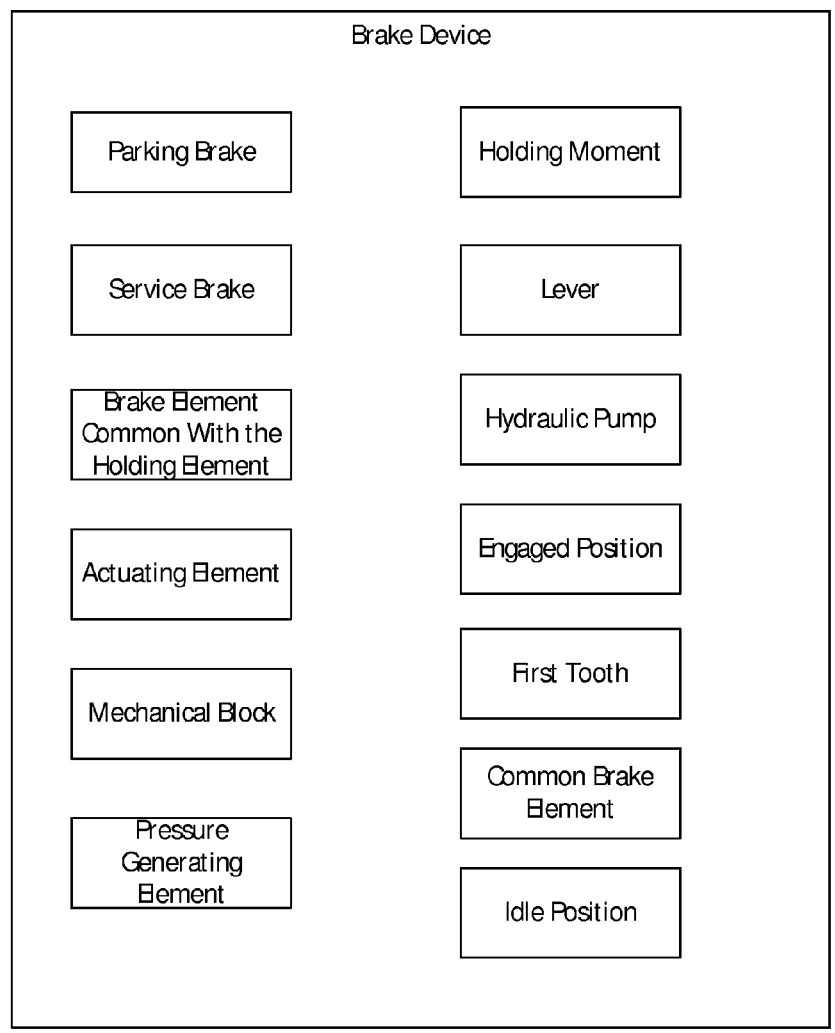
FIG. 2 shows a block diagram of a brake device.

The method in accordance with the invention commences in block 1, in which it is established that an actuating element has been moved from its idle position into one of its positions of use. In other words, it is established in block 1 whether the parking brake is to be activated.

It is established in a decision block 2 whether a static parking brake mode or a dynamic parking brake mode is prevailing, which can be detected by means of the rotational speed of the wheels, i.e. using corresponding sensors.

The two signals "wheel rotation rate" and "actuation of the parking brake" are processed accordingly in block 2, so that a control signal is generated. If a static mode is recognized, the method is continued with block 3. If a dynamic mode is recognized, the method is continued with block 4.

In the static mode, a signal is generated in block 3, which signal activates the hydraulic pump of the ESP-unit, wherein preferably the maximum hydraulic pressure is generated, which acts on the rear wheel brakes or on the rear axle brake, so that a maximum holding moment is generated. This means that the amount of hydraulic pressure generates such a holding moment that can hold a vehicle whilst absorbing the greatest loading (Gross Vehicle Weight Condition; GVW Condition) on a 30% slope/incline.

It is queried in block 5 that follows block 3 whether the parking brake signal has been present for more than a predetermined time, i.e., for example, for more than 10 seconds. If this is not the case, the method jumps back to block 3. If, on the other hand, the response to the query is positive, the method is continued with block 6. The numerical values quoted are naturally only by way of example.

The static mode is terminated in block 6, wherein the hydraulic pressure, which acts on the rear wheel brake and/or axle brake, is reduced and/or is reduced to zero. Naturally, the parking brake is mechanically blocked, i.e. is held in this manner in the activated position, until the actuating element is moved into the idle position, and the parking brake is released from the mechanical blocking arrangement.

However, if the dynamic state is detected, the method continues with block 4 and causes the pressure build-up to be delayed, i.e., such that the ESP-unit and/or its hydraulic pump generate a predetermined amount of hydraulic pressure in order to brake the rear axle in the dynamic state. In so doing, a braking moment and/or holding moment is generated which creates a deceleration of 0.15 G whilst absorbing the greatest loading (Gross Vehicle Weight Condition; GVW Condition).

As an option, a block 7 can follow block 6, with which the deceleration is generated in proportion to the actuating force on the actuating element, once the initial deceleration (block 6) has been created.

In the decision block 8 that follows on either from block 6 or block 7 it is detected whether the parking brake signal is active. If this is the case, the method jumps back to block 4. If this is not the case, the dynamic mode is terminated with block 9, wherein the hydraulic pressure, which acts on the rear wheel brake and/or axle brake, is reduced and/or is reduced to zero.

In one embodiment, an additional signal can still be generated which indicates that the actuating element latches at least in one of its positions of use, i.e. at least in the first tooth of the ratchet. Using this signal, the query in block 5 can be changed, in place of the previous query, regarding the period of time the parking brake is active, as to whether the actuating element is latched in. If the response to the query is negative, the method jumps back to block 3 otherwise the method continues with block 6.

In a further embodiment, in addition to the previously mentioned signals, the actuating force signal of the actuating element can also be included in the method. A signal of this type can be obtained by way of an angle sensor. If this signal is additionally used as an input signal, the force can be proportionally increased in an optional block 10 that follows the block 3, wherein in the subsequent block 5 it is queried whether the actuating element is latched in, and depending upon the response to the query the method jumps back to block 3 or continues with block 6. An optional block 11 can be included in the dynamic branch, which optional block can, as in the case of block 10, also proportionally increase the force. Block 8 then follows block 11 with the query of the parking brake signal.

The invention claimed is:

1. A method for operating a brake device, wherein the brake device comprises a service brake and a mechanical parking brake, wherein the parking brake can be actuated by a mechanical actuating element, comprising at least the steps of:
   establishing that the actuating element has been moved from an idle position into a position of use,
   simultaneously controlling a pressure-generating element, wherein the pressure-generating element causes an increase in a hydraulic pressure acting on a common brake element of the service and parking brakes, wherein the amount of increase of hydraulic pressure applied depends on a static or dynamic state,
   increasing the amount of hydraulic pressure acting on the common brake element based on an actuation level of the actuating element in a dynamic state, applying a maximum amount of hydraulic pressure to the common brake element at any actuation level of the actuating element in a static state, and blocking the common brake element of the service brake and the parking brake with a mechanical block of the mechanical parking brake.

2. The method as claimed in claim 1, further comprising: controlling a hydraulic pump of an ESP-unit, which builds up the hydraulic pressure.

3. The method as claimed in claim 2, wherein the pressure-generating element receives a control signal of the type that corresponds to the actuation level of the actuating element, so that the pressure-generating element causes in the hydraulic fluid an increase in pressure that corresponds to the control signal and has an actuating effect on the brake elements.

4. The method of claim 3, wherein an actuating resistance of the actuating element is increased with an increasing deflection from the idle position.

5. The method of claim 4, wherein the parking brake is set during the hydraulic support of the parking brake and a holding element is statically secured.

6. The method of claim 5, wherein an additional monitoring element generates a control signal if the actuating element latches in at least a first tooth.

7. The method of claim 6, wherein the hydraulic pressure is maintained until an established actuating signal is generated that the brake element is latched in, i.e. the parking brake, is applied, or until the established actuating signal is cancelled, and in addition the signal is generated that the brake element passively remains at rest, i.e. the parking brake is not applied.

8. The method of claim 7, wherein it is possible to increase a force applied to the brake element in proportion to the travel of the actuating element.

9. The method of claim 8, wherein in the dynamic state the rear wheel brakes are influenced with a predetermined hydraulic pressure that corresponds to a defined moderate deceleration in the loaded state, so that a defined response of the dynamic parking brake occurs, wherein the further build-up of the deceleration is in proportion to the actuating force.

10. A method, comprising:
generating a holding force of a parking brake during interaction of a mechanical parking brake with a hydraulically-actuated service brake by supplementing the holding force via increased hydraulic pressure without activating the service brake applying hydraulic pressure only during application of effort by a user on the parking brake, applying a maximum amount of hydraulic pressure when in a static mode, where the static mode is determined when wheel speed is below a first threshold, applying a moderate first amount of hydraulic pressure when in a dynamic mode, where the dynamic mode is determined when the wheel speed is above the first threshold, and increasing the amount of hydraulic pressure from the first amount to a second amount where an amount of increase is based on effort of the user on the parking brake; and activating the service brake without actuation of the parking brake.

11. The method of claim 10, wherein the increase in hydraulic pressure only supports the mechanical parking brake only responsive to user actuation, wherein the hydraulic pressure is not continuously maintained in order to maintain the holding force.

12. The method of claim 11, wherein both the parking brake and the service brake act on a common brake element.

13. The method of claim 12 wherein the hydraulic pressure is generated via a hydraulic pump, and wherein a mechanical lock of the mechanical parking brake is simultaneously active so that the common element is locked and remains actuated if a user no longer actuates a user-interface lever.

14. The method of claim 12 wherein the holding force is released via a release of the user-interface lever by the user.

15. A method for operating a service brake and a mechanically-actuated parking brake of a vehicle both acting on a common brake element, comprising:
upon movement of the parking brake from an idle position into an engaged position, simultaneously increasing a hydraulic pressure on the common brake part, the amount of hydraulic pressure increase based on a dynamic or static state, including
in a static state where the wheel speed is below a first threshold, applying a maximum amount of hydraulic pressure,
in a dynamic state where the wheel speed is above a first threshold, applying different amounts of hydraulic pressure based on user actuation of the mechanical parking brake; and
blocking the common brake element with a mechanical block of the mechanical parking brake.

16. The method of claim 15 further comprising reducing the increased hydraulic pressure upon the blocking.

* * * * *